United States Patent
Miyamoto et al.

(10) Patent No.: US 7,659,641 B2
(45) Date of Patent: Feb. 9, 2010

(54) MOVING MAGNET TYPE LINEAR SLIDER

(75) Inventors: Yasuhiro Miyamoto, Kitakyushu (JP); Tatsuhiko Koba, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 472 days.

(21) Appl. No.: 11/637,245

(22) Filed: Dec. 12, 2006

(65) Prior Publication Data

US 2007/0096567 A1    May 3, 2007

Related U.S. Application Data

(63) Continuation-in-part of application No. PCT/JP2005/008678, filed on May 12, 2005.

(30) Foreign Application Priority Data

Jun. 14, 2004  (JP)  ............................. 2004-175306

(51) Int. Cl.
  *H02K 41/00*  (2006.01)
  *H02K 41/02*  (2006.01)
(52) U.S. Cl. ...................................... 310/13; 310/12.01
(58) Field of Classification Search ............... 310/12–16
  See application file for complete search history.

(56) References Cited

U.S. PATENT DOCUMENTS 6,573,623 B2 *  6/2003  Tsuboi et al. ................. 310/12

FOREIGN PATENT DOCUMENTS

JP    2004015904 A  *  1/2004
JP    2005278280 A  *  10/2005

OTHER PUBLICATIONS

Machine Translation on JP2005278280 A and JP2004015904A.*

* cited by examiner

*Primary Examiner*—Quyen Leung
*Assistant Examiner*—Jose A Gonzalez Quinones
(74) *Attorney, Agent, or Firm*—Westerman, Hattori, Daniels & Adrian, LLP

(57) ABSTRACT

In some embodiments, a moving magnet type linear slider capable of eliminating a magnet suction force caused by a linear motor to minimize the linear guide friction is provided. The field of the linear motor includes magnet track having a horizontally arranged generally U-shaped magnetic yoke and plural pairs of field permanent magnets arranged on inner opposed surfaces of the magnetic yoke with polarities arranged alternately in a longitudinal direction of the magnetic yoke, each pair of the filed permanent magnets being arranged with opposite polarities faced with each other. The armature of the linear motor includes an armature holder mounted on the side portion of the fixed base in a vertically extended manner, and a planar coreless armature holder horizontally held by the armature holder. The stroke direction length $L_{mg}$ of the magnet track is set to be longer than the stroke direction length $L_a$ of the armature. Furthermore, a gravity compensation spring for compensating the weight of the movable unit is provided at the bottom portion of the magnet track so as to face the fixed base.

16 Claims, 6 Drawing Sheets

(Present invention)

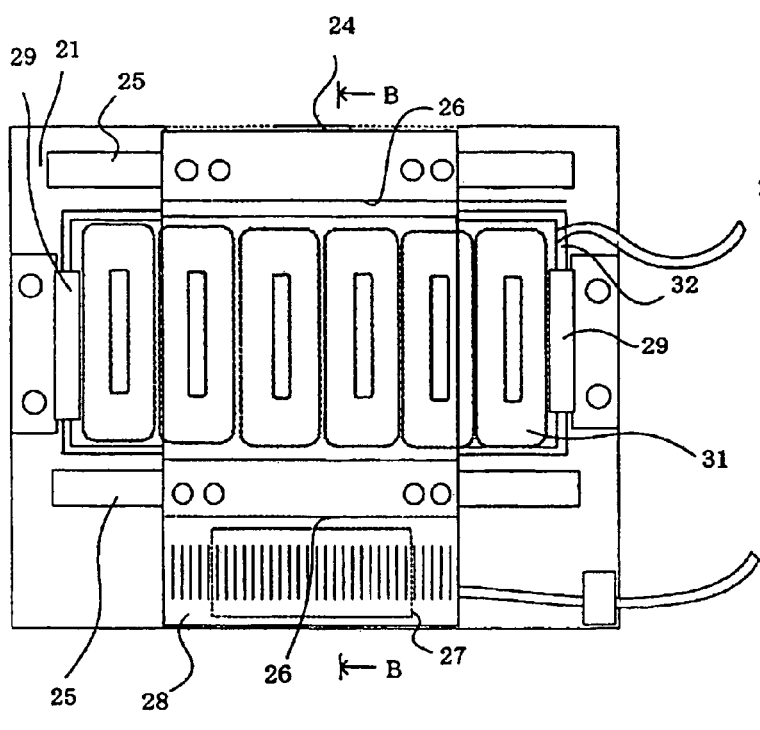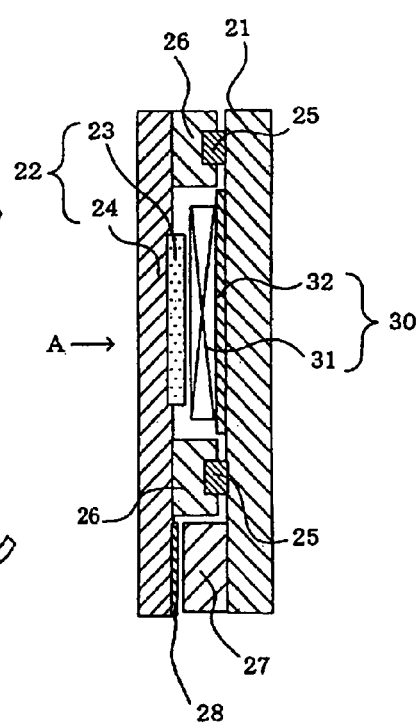
FIG. 6A
(RELATED ART)
FIG. 6B
(RELATED ART)

MOVING MAGNET TYPE LINEAR SLIDER

This application is a continuation-in-part of International Patent Application No. PCT/JP2005/008678 filed on May 12, 2005. This application claims priority under 35 U.S.C. §119 to Japanese Patent Application No. 2004-175306 filed on Jun. 14, 2004. Each of the entire disclosures of these applications is incorporated herein by reference in its entirety.

BACKGROUND OF THE INVENTION

1. Field of the Invention

The present invention relates to a linear motor for use in various industrial machinery, such as, e.g., electrical component mounting apparatuses, semiconductor related apparatuses, or machine tools, and suitably used for driving the direct acting mechanism thereof, and more specifically to a moving magnet type linear slider equipped with a magnetic field system having permanent magnets as a moving unit and an armature having an armature winding as a stator.

2. Description of Related Art

The following description sets forth the inventor's knowledge of related art and problems therein and should not be construed as an admission of knowledge in the prior art.

FIGS. 6A and 6B show a conventionally available moving magnet type linear slider for use in various industrial machinery, such as, e.g., electrical component mounting apparatuses, semiconductor related apparatuses, or machine tools, and suitably used for driving the direct acting mechanism thereof. FIG. 6A is a plan view of a conventional moving magnet type linear slider, and FIG. 6B is a cross-sectional view taken along the line B-B in FIG. 6A.

In FIGS. 6A and 6B, the reference numeral "21" denotes a fixed base, "22" denotes a magnet track, "23" denotes a field permanent magnet, "24" denotes a field yoke, "25" denotes a guide rail, "26" denotes a guide block, "27" denotes a sensor head, "28" denotes a linear scale, "29" denotes a stopper, "30" denotes an armature, "31" denotes an armature coil, and "32" denotes a circuit board.

In the linear slider shown in FIGS. 6A and 6B, the field yoke 24 is provided on the back of the field permanent magnet 23. The field yoke 24 serves as a movable unit and a magnetic circuit. The armature 30 is provided with a plurality of slotless armature coils 31 fixed to a circuit board 32 arranged on the fixed base 21 made of solid magnetic material so as to face the movable unit via a magnetic gap, which constitutes a stator. A plurality of hall elements (not illustrated) for performing magnetic pole detection are embedded in the circuit board 32 so as to face the field permanent magnet 23. The hall element (not illustrated) detects the position of the field magnet opposed to the hall element at the time of the early stage when the electric power supply is turned on, and outputs a detection signal for passing a driving current through the armature coil 31 in response to the position of the detected field magnet 23 (see, for example, Japanese Unexamined Laid-open Patent Publication No. H09-266659, page 5 of the specification, FIG. 3).

At both sides of this armature 30, guide rails 25 and 25 arranged in parallel are fixed on the fixed base 21, and guide blocks 26 and 26 slidably disposed on the guide rails 25 and 25 are fixed to the lower surfaces of both end portions of the field yoke 24. At the side of the movable unit, a magnetic type linear scale 28 constituting a linear type encoder is provided. A sensor head 27 for detecting the linear scale 28 is provided at the fixed base 21 so as to face the linear scale 28. Stoppers 29 and 29 each for preventing the overrun of the movable unit are provided between the end portions of the two guide rails 25 and 25.

This linear slider has a magnetic circuit structure in which the magnetic flux of the field permanent magnet 23 interlinks the fixed base 21, and is configured such that the movable unit is linearly moved within a stroke which is a difference between the length of the armature 30 and the length of the movable unit by the shifting magnetic fields formed by the field 23 and the armature 30 when the armature coil 31 is excited (see, for example, Japanese Unexamined Laid-open Patent Publication No. H09-266659, page 5 of the specification, FIG. 3, and Japanese Unexamined Laid-open Patent Publication No. H2002-10617, pages 7-9 of the specification, FIGS. 1 and 3).

In the conventional linear slider, since it is configured such that the armature 30 and the field permanent magnet 23 constituting the linear motor face with each other at each one side, a magnetic suction force will act between these two members. Therefore, the linear motor is supported by the guide rails 25 and 25 and the guide blocks 26 and 26 arranged in two rows to reduce the torsion moment caused by the magnetic suction force. This structure, however, increases the guide friction caused by the magnetic suction force acting on the linear guide. Furthermore, parallelism errors of the guide rails 25 and 25 cause partial friction changes in the stroke direction, resulting in inconstant thrust, which in turn prevents minute thrust control.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a moving magnet type linear slider which is low in viscous-friction and capable of minimizing linear guide friction.

According to one aspect of the present invention, a moving magnet type linear slider includes a linear motor placed opposite to a fixed base in parallel, the linear motor having a field constituting a movable unit and an armature constituting a stator, a linear guide including a guide rail and a guide block, the guide rail and the guide block being configured to support and guide the movable unit of the linear motor, and a detector for detecting a relative position of the movable unit and the fixed base.

The movable unit is configured to be reciprocated with respect to the fixed base along a longitudinal direction of the guide rail. The field of the linear motor is constituted by a magnet track including a horizontally arranged generally U-shaped magnetic yoke disposed on the guide block and plural pairs of field permanent magnets arranged on inner opposed surfaces of the magnetic yoke with polarities arranged alternately in a longitudinal direction of the magnetic yoke, each pair of the filed permanent magnets being arranged with opposite polarities faced with each other. The armature of the linear motor is constituted by an armature holder upwardly extended from one side of the fixed base, and a planar coreless armature coil perpendicularly extended from the armature holder so as to be arranged between the pairs of field permanent magnets via magnetic gaps. The detector is constituted by a linear scale attached to a lower surface of a bottom of the magnetic yoke so as to be located at an opposite side of an opening portion of the magnetic yoke, and a sensor head attached to an upper surface of the fixed base so as to be located at an opposite side of an armature holder so that the sensor head faces the linear scale.

According to this moving magnet type linear slider, a magnet suction force caused by the linear motor can be eliminated to thereby prevent application of pressure to the linear guide and that the linear guide can be arranged at one location on or near the linear motor thrust central axis, which minimizes the linear guide friction. Consequently, the minute thrust control of the linear slider can be improved.

In the moving magnet type linear slider mentioned above, preferably, a stroke direction length $L_{mg}$ of the magnet track is set to be longer than a stroke direction length $L_a$ of the armature, a difference $L_{mg}-L_a$ between the stroke direction length of the magnet track and that of the armature defines an effective stroke length, and a magnetic pole detector is build in the armature to detect an initial magnetic pole of the linear slider.

According to this moving magnet type linear slider, even in cases where the movable unit moves the stroke length, the initial magnetic pole detection can be consistently performed by the magnetic pole detector. This eliminates the needs of magnetic pole detection by software at the time of turning on the electric power.

In the moving magnet type linear slider mentioned above, preferably, a stroke direction length $L_{mg}$ of the magnet track is set to be shorter than a stroke direction length $L_a$ of the armature, and a difference $L_a-L_{mg}$ between the stroke direction length of the magnet track and that of the armature defines an effective stroke length.

According to this moving magnet type linear slider, since the magnet track length is shorter than the coreless armature length, the driving stroke can be secured within the entire fixed base length, resulting in a compact linear slider.

In the moving magnet type linear slider mentioned above, preferably, a stroke direction length $L_{mg}$ of the magnet track is set to be longer than a stroke direction length $L_a$ of the armature, a difference $L_{mg}-L_a$ between the stroked direction length of the magnet track and that of the armature defines an effective stroke length, and a magnetic pole detector formed separately from the armature is arranged beside an end of the armature opposite to a motor lead side of the armature so that magnetic pole detection can be consistently performed even if the magnet track is moved to a stroke end.

According to this moving magnet type linear slider, even in cases where the movable unit moves the stroke length, the initial magnetic pole detection can be always performed by the magnetic pole detector. This eliminates the needs of magnetic pole detection by software at the time of turning on the electric power.

In the moving magnet type linear slider mentioned above, preferably, the moving magnet type linear slider further comprises a gravity compensation spring for compensating a weight of the movable unit, the gravity compensation spring being provided at a bottom of the magnet track so as to face the fixed base.

According to this moving magnet type linear slider, minute thrust force control can be performed while keeping the compactness.

According to another aspect of the present invention, a moving magnet type linear slider includes a linear motor slidably arranged on a fixed base via a linear guide, the linear motor having a field constituting a movable unit and an armature constituting a stator, a detector for detecting a relative position of the movable unit and the fixed base. The movable unit is configured to be reciprocated with respect to the fixed base along a longitudinal direction of the linear guide. The field of the linear motor includes a horizontally arranged generally U-shaped magnetic yoke and field permanent magnets arranged on inner opposed surfaces of the magnetic yoke. The armature of the linear motor is a planar coreless type armature fixed to the fixed base via an armature holder and arranged between the inner opposed surfaces of the magnet yoke. The detector includes a linear scale attached to the movable unit and a sensor head attached to the fixed base so that the sensor head faces the linear scale.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 6A is a plan view of a conventional linear slider;

FIG. 6B is a cross-sectional view of the conventional linear slider taken along the line B-B in FIG. 6A.

DETAILED DESCRIPTION OF THE INVENTION

In the following paragraphs, some preferred embodiments of the invention will be described by way of example and not limitation. It should be understood based on this disclosure that various other modifications can be made by those in the art based on these illustrated embodiments.

Hereinafter, preferred embodiments of the present invention will be explained with reference to the attached drawings.

Figure 1:
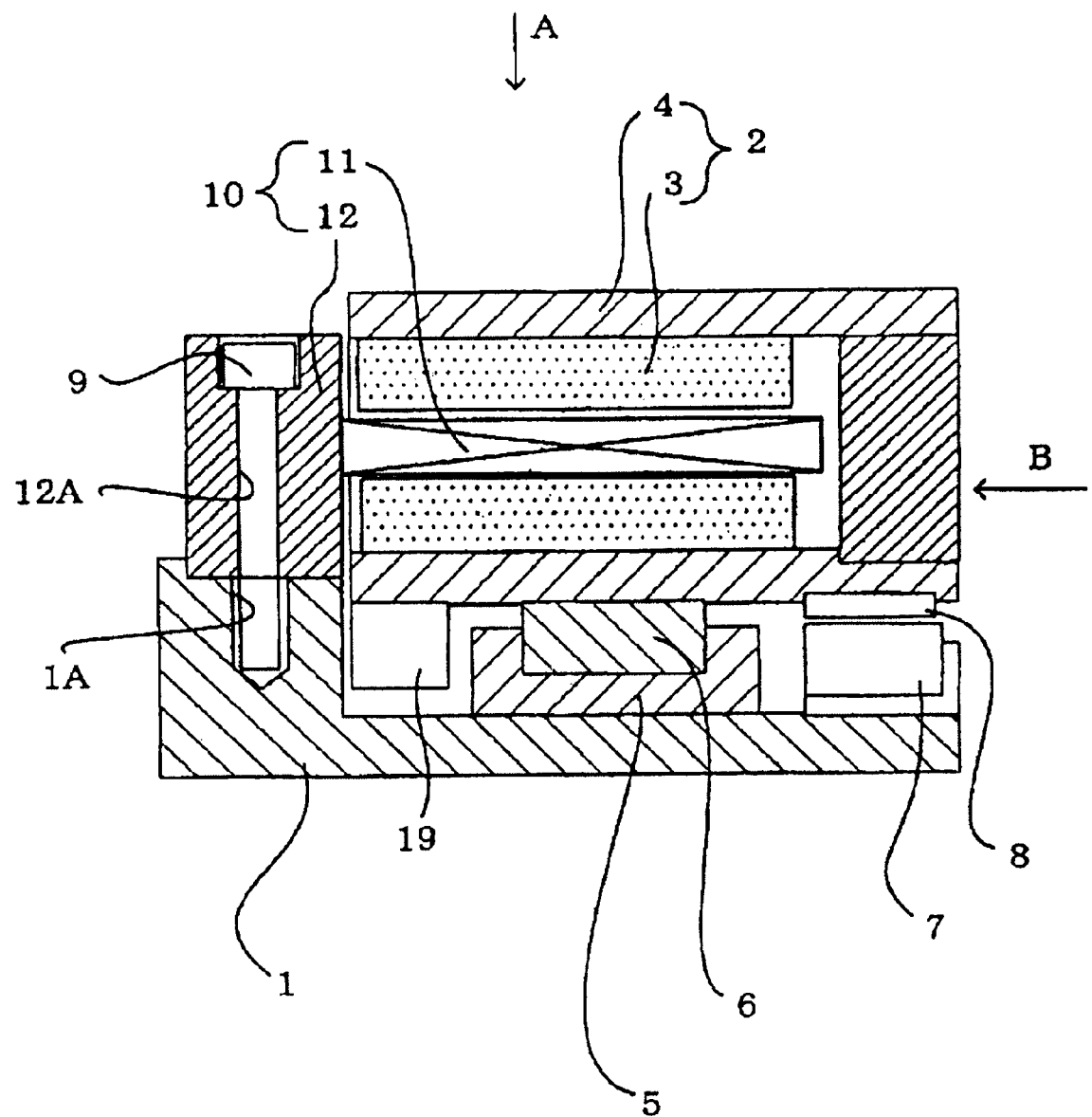
FIG. 1 is a cross-sectional view of a moving magnet type linear slider which is common to first to third embodiments of the present invention.
Figure 2A:
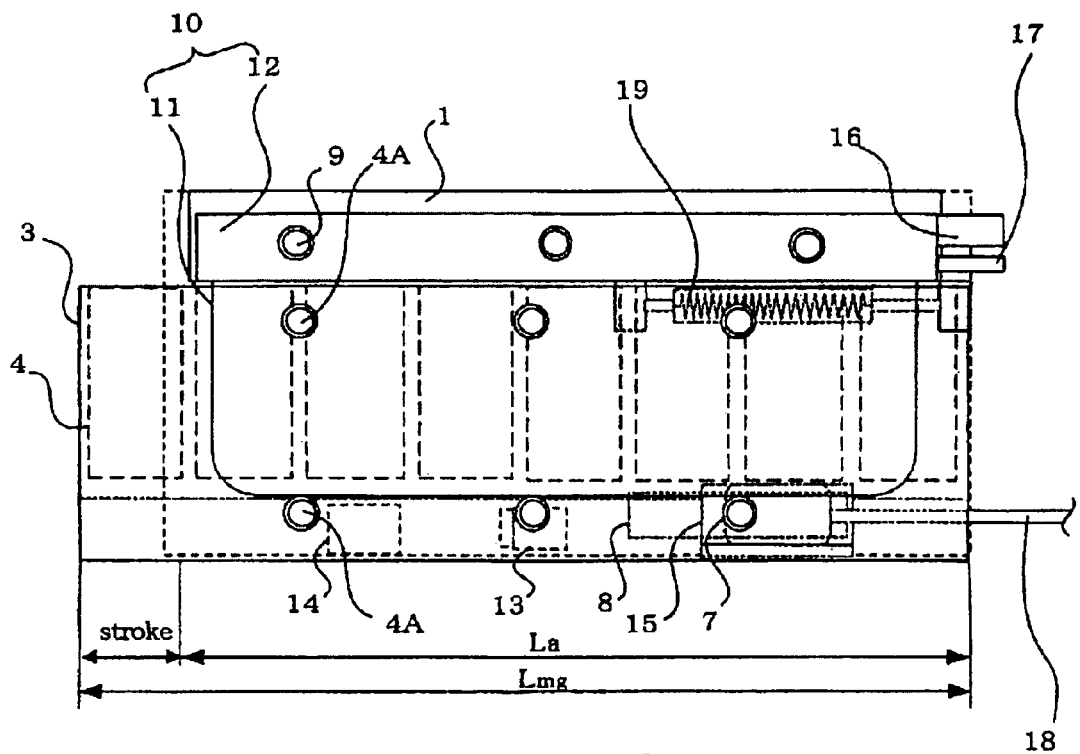
FIG. 2A is a plan view of a linear slider of a first embodiment as seen from the arrow A shown in FIG. 1.
Figure 2B:
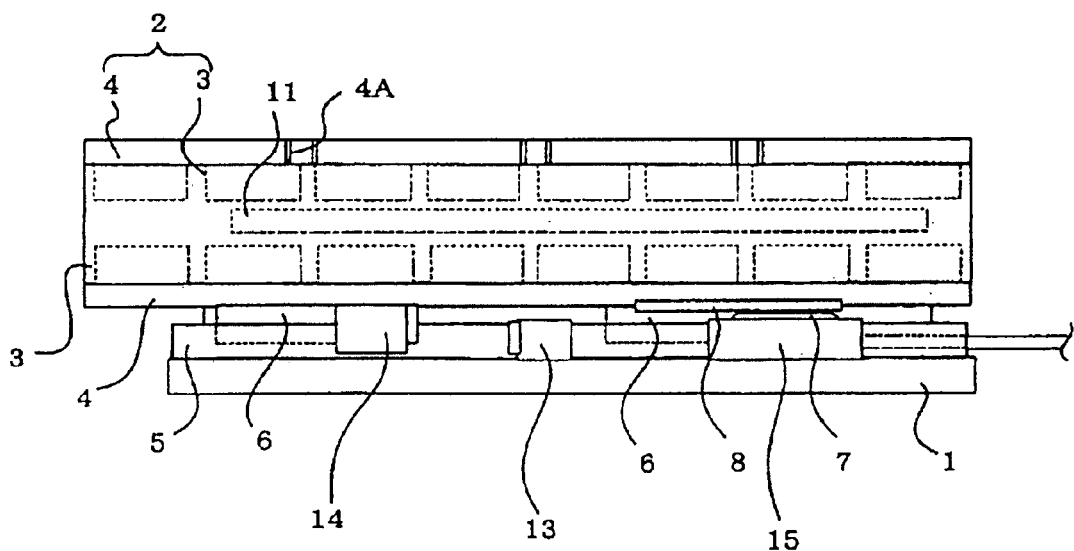
FIG. 2B is a side view of the linear slider of the first embodiment as seen from the arrow B shown in FIG. 1.

FIG. 1 is a cross-sectional view of a moving magnet type linear slider which is common to first to third embodiments of the present invention, FIG. 2A is a plan view of the linear slider of the first embodiment as seen from the arrow A shown in FIG. 1, and FIG. 2B is a side view of the linear slider of the first embodiment as seen from the arrow B shown in FIG. 1.

In FIGS. 1 to 3, the reference numeral "1" denotes a fixed base, "1A" denotes a female screw portion, "2" denotes a magnet track, "3" denotes a field permanent magnet, "4" denotes a magnetic yoke, "4A" denotes a female screw portion, "5" denotes a linear guide rail, "6" denotes a guide block. "7" denotes a sensor head, "8" denotes a linear scale, "9" denotes a bolt, "10" denotes an armature, "11" denotes an armature coil, "12" denotes an armature holder, "12A" denotes a through hole, "13" denotes a stopper, "14" denotes a pressing portion, "15" denotes a sensor holder, "16" denotes a motor lead, "17" denotes a magnetic pole detector lead, "18" denotes a linear scale lead, and "19" denotes a gravity compensation spring.

This moving magnet type linear slider differs from a conventional linear slider in the following points. In this moving magnet type linear slider, the field of the linear motor is constituted by a magnet track 2 including a horizontally arranged generally U-shaped magnetic yoke 4 disposed on the guide block 6 and plural pairs of field permanent magnets 3 and 3 arranged on inner opposed surfaces of the magnetic yoke 4 with polarities arranged alternately in a longitudinal direction of the magnetic yoke 4, each pair of the filed permanent magnets 3 and 3 being arranged with magnetic poles opposed with each other. The armature 10 of the linear motor is constituted by an armature holder 12 upwardly extended from one side of the fixed base 1, and a planar coreless armature coil 11 perpendicularly extended from the armature holder 12 so as to be arranged between the pairs of field permanent magnets 3 and 3 via magnetic gaps, which is a magnet suction force offset structure.

Furthermore, a detector is constituted by a linear scale 8 attached to a lower surface of a bottom of the magnetic yoke 4 so as to be located at the opposite side of the opening portion of the magnetic yoke 4, and a sensor head 7 attached to an upper surface of a portion of the fixed base 1 opposite to an armature holder attached side so that the sensor head 7 faces the linear scale 8.

Furthermore, the stroke direction length $L_{mg}$ of the magnet track 2 is set to be longer than a stroke direction length $L_a$ of the armature 10, the difference $L_{mg} - L_a$ between the stroke direction length of the magnet track 2 and that of the armature 10 defines an effective stroke length, and a magnetic pole detector (not illustrated) is mounted in the armature 10 to detect the initial magnetic pole of the linear slider.

Furthermore, this moving magnet type linear scale includes a gravity compensation spring 19 for compensating a weight of the movable unit, the gravity compensation spring being provided at a bottom of the magnet track 2 so as to face the fixed base 1.

Next, the operation of this moving magnet type linear slider will be explained.

As shown in FIGS. 1, 2A and 2B, in this moving magnet type linear slider, when an electric power is supplied from an external power source (not illustrated) to the armature 10 of the linear motor, the magnet track 2 is reciprocated with respect to the fixed base 1 on the guide rail 5 along the longitudinal direction thereof. The sensor head 7 is provided at the fixed base 1 while the linear scale 8 is provided at the magnet track 2, and therefore the sensor head 7 detects the relative position of the magnet track 2 and the fixed base 1.

Figure 3A:
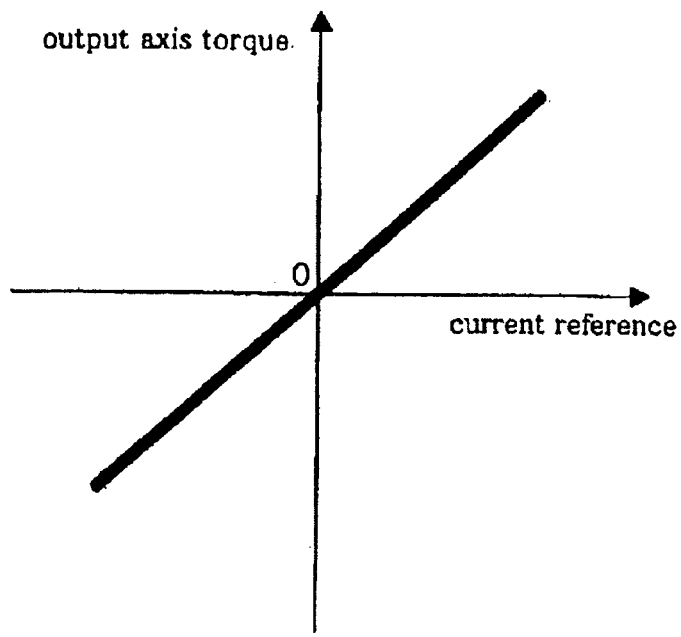
FIG. 3A shows a thrust property of operation of a moving magnet type linear slider according to the first to third embodiment of the present invention.
Figure 3B:
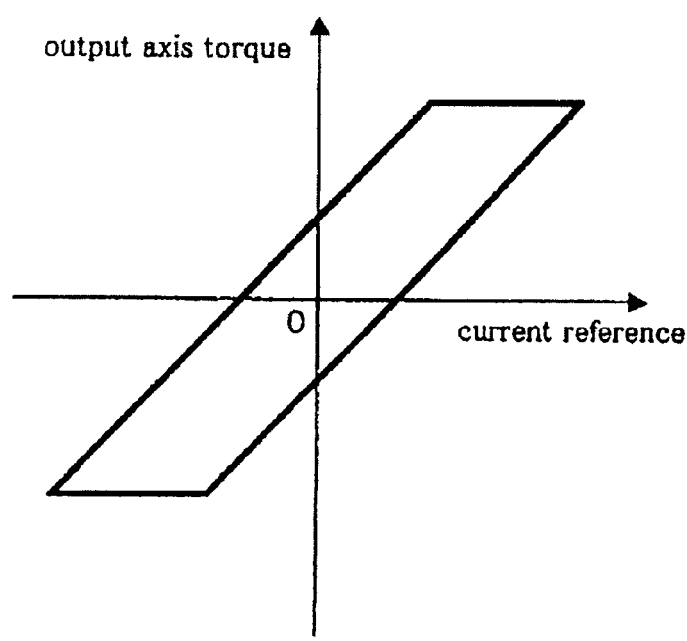
FIG. 3B shows a thrust property of operation of a conventional moving magnet type linear slider.

FIG. 3A shows a thrust property of operation of the moving magnet type linear slider according to this embodiment, while FIG. 3B shows a thrust property of operation of a conventional linear slide. As shown in FIG. 3A, as compared to the conventional linear slider, in this embodiment, the thrust property to the current has no hysteresis, which enables minute thrust control of the linear slider.

As mentioned above, in this embodiment, since the arrangement of the field and the armature of the linear motor is configured such that the magnetic suction force caused therebetween can be offset, the magnetic suction force caused by the linear motor can be eliminated to avoid application of the force to the linear guide, and that the linear guide can be arranged at one location on or near the linear motor thrust central axis, which minimizes the linear guide friction. Consequently, minute thrust control of the linear slider can be improved.

Furthermore, in the linear slider of this embodiment, it is configured such that the magnet track length is set to be longer than the coreless armature length and that a magnetic pole detector is built in the armature. Therefore, the length difference defines the effective stroke of the linear slider, and the magnetic pole detector built in the armature can easily perform the initial magnetic pole detection.

Furthermore, since the gravity compensation spring 19 for compensating the weight of the movable unit is provided so as to face the fixed base 1, minute thrust force control can be performed while keeping the compactness.

Figure 4A:
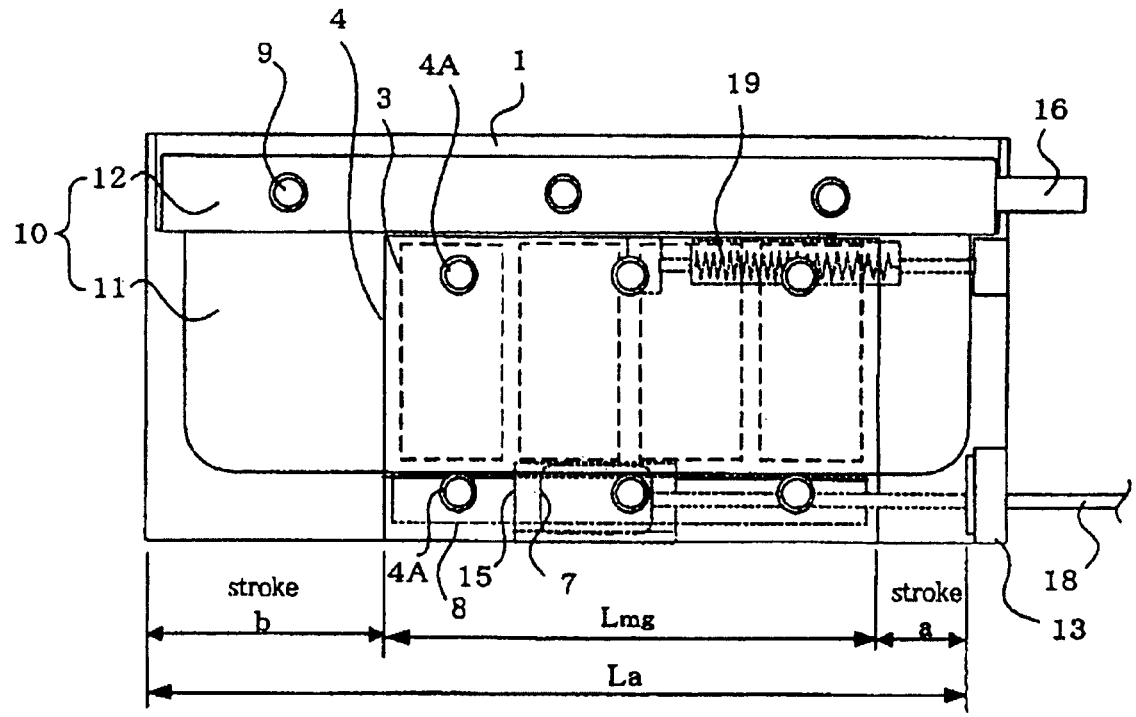
FIG. 4A is a plan view of a linear slider of a second embodiment as seen from the arrow A shown in FIG. 1.
Figure 4B:
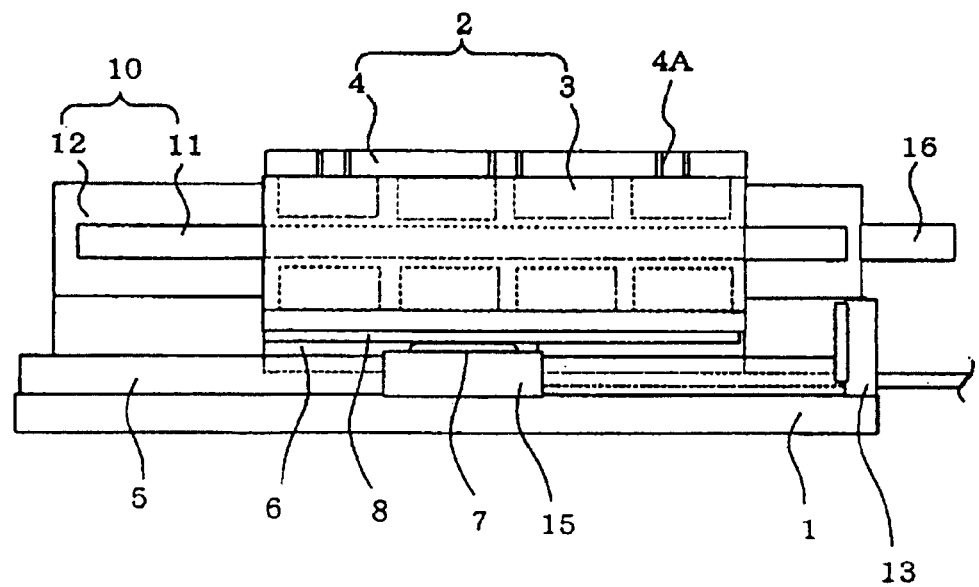
FIG. 4B is a side view of the linear slider of the second embodiment as seen from the arrow B shown in FIG. 1.

FIG. 4A is a plan view of a linear slider of a second embodiment as seen from the arrow A shown in FIG. 1, and FIG. 4B is a side view of the linear slider of the second embodiment as seen from the arrow B shown in FIG. 1.

This embodiment differs from the first embodiment in that a stroke direction length $L_{mg}$ of the magnet track 2 is set to be shorter than a stroke direction length $L_a$ of the armature 10 and that the difference $L_a - L_{mg}$ between the stroke direction length of the magnet track 2 and that of the armature 10 defines an effective stroke length. Furthermore, in this embodiment, the initial magnetic pole detection of the linear slider is performed by software. In the meantime, initial magnetic pole detection of the linear slider requires a magnetic pole search by software at the time of turning on the power supply.

Accordingly, in this embodiment, the coreless armature length is set to be shorter than the magnet track length and the length difference defines the effective stroke of the linear slider. Therefore, the drive stroke can be secured within the entire length of the fixed base 1, resulting in a compact linear slider.

The other structure of this embodiment is the same as that of the first embodiment. Accordingly, the cumulative explanation will be omitted by allotting the same reference numeral as in the first embodiment to the corresponding portion of the second embodiment.

Figure 5A:
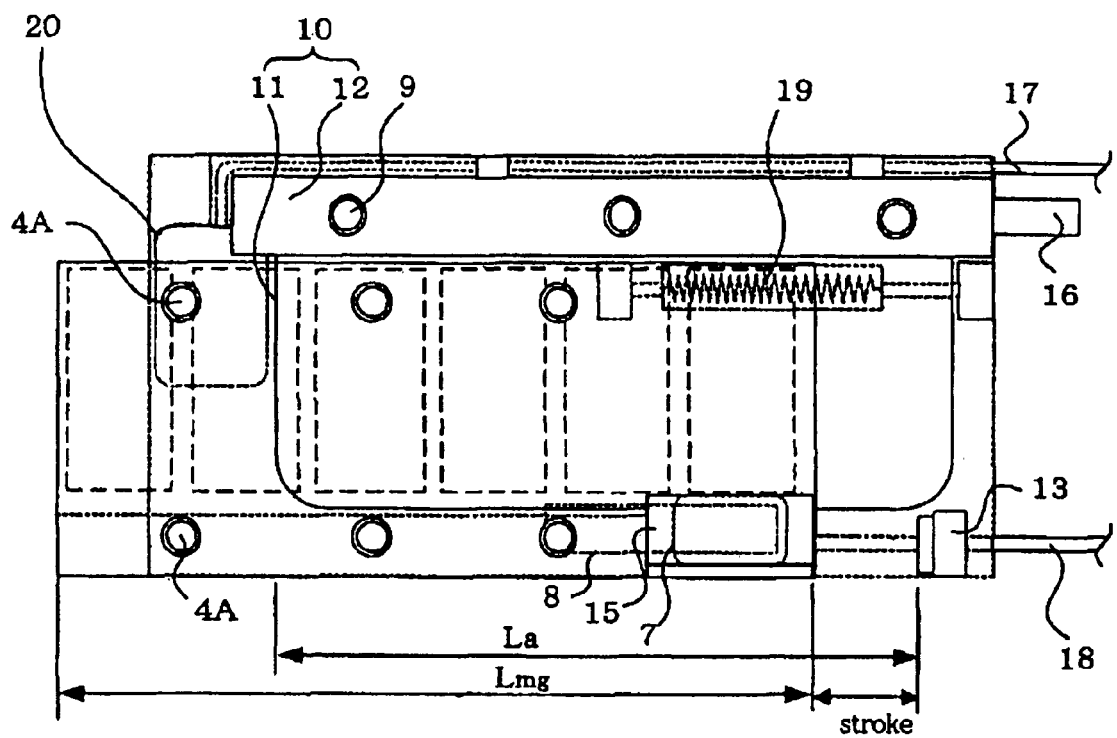
FIG. 5A is a plan view of a linear slider of a third embodiment as seen from the arrow A shown in FIG. 1.
Figure 5B:
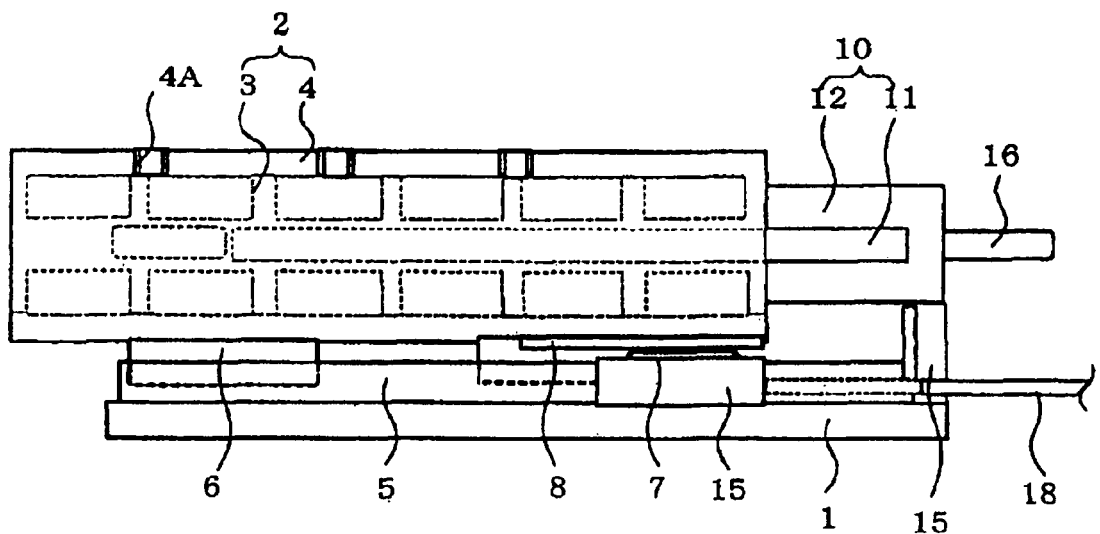
FIG. 5B is a side view of the linear slider of the third embodiment as seen from the arrow B shown in FIG. 1.

FIG. 5A is a plan view of a linear slider of a third embodiment as seen from the arrow A shown in FIG. 1, and FIG. 5B is a side view of the linear slider of the third embodiment as seen from the arrow B shown in FIG. 1.

This embodiment differs from the first embodiment in that a stroke direction length $L_{mg}$ of the magnet track 2 is set to be longer than a stroke direction length $L_a$ of the armature 10, the difference $L_{mg} - L_a$ between the stroked direction length of the magnet track 2 and that of the armature 10 defines an effective stroke length, and a magnetic pole detector formed separately from the armature 10 is arranged beside an end of the armature 10 opposite to a motor lead side of the armature 10 so that magnetic pole detection can be consistently performed even if the magnet track 2 is moved to the stroke end.

In this embodiment, since the stroke direction length $L_{mg}$ of the magnet track 2 is set to be longer than the stroke direction length $L_a$ of the armature 10 and that the magnetic pole detector formed separately from the armature 10 is arranged beside the end of the armature 10, even in cases where the movable unit moves the full stroke length, the initial magnetic pole detection can be consistently performed by the magnetic pole detector. This eliminates the needs of magnetic pole detection by software at the time of turning on the electric power which is required in the second embodiment.

The other structure of this second embodiment is the same as that of the first embodiment. Accordingly, the cumulative explanation will be omitted by allotting the same reference numeral as in the first embodiment to the corresponding portion of this third embodiment.

According to the present invention, minute thrust control can be performed by decreasing the linear guide friction and making the friction constant in the stroke area. Therefore, the linear slider can be applied to various industrial machinery, such as, e.g., electrical component mounting apparatuses, semiconductor related apparatuses, machine tools, and a glass cutting machine which requires minute control of the tip end portion.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A moving magnet type linear slider, comprising:
a linear motor placed opposite to a fixed base in parallel, the linear motor having a field constituting a movable unit and an armature constituting a stator;
a linear guide including a guide rail and a guide block, the guide rail and the guide block being configured to support and guide the movable unit of the linear motor; and
a detector for detecting a relative position of the movable unit and the fixed base,
wherein the movable unit is configured to be reciprocated with respect to the fixed base along a longitudinal direction of the guide rail,
wherein the field of the linear motor is constituted by a magnet track including a horizontally arranged generally U-shaped magnetic yoke disposed on the guide block and plural pairs of field permanent magnets arranged on inner opposed surfaces of the magnetic yoke with polarities arranged alternately in a longitudinal direction of the magnetic yoke, each pair of the filed permanent magnets being arranged with opposite polarities faced with each other,
wherein the armature of the linear motor is constituted by an armature holder upwardly extended from one side of the fixed base, and a planar coreless armature coil perpendicularly extended from the armature holder so as to be arranged between the pairs of field permanent magnets via magnetic gaps, and
wherein the detector is constituted by a linear scale attached to a lower surface of a bottom of the magnetic yoke so as to be located at an opposite side of an opening portion of the magnetic yoke, and a sensor head attached to an upper surface of the fixed base so as to be located at an opposite side of an armature holder so that the sensor head faces the linear scale.

2. The moving magnet type linear slider as recited in claim 1, wherein a stroke direction length $L_{mg}$ of the magnet track is set to be longer than a stroke direction length $L_a$ of the armature, wherein a difference $L_{mg}-L_a$ between the stroke direction length of the magnet track and that of the armature defines an effective stroke length, and wherein a magnetic pole detector is built in the armature to detect an initial magnetic pole of the linear slider.

3. The moving magnet type linear slider as recited in claim 1, wherein a stroke direction length $L_{mg}$ of the magnet track is set to be shorter than a stroke direction length $L_a$ of the armature, and wherein a difference $L_a-L_{mg}$ between the stroke direction length of the magnet track and that of the armature defines an effective stroke length.

4. The moving magnet type linear slider as recited in claim 1, wherein a stroke direction length $L_{mg}$ of the magnet track is set to be longer than a stroke direction length $L_a$ of the armature, wherein a difference $L_{mg}-L_a$ between the stroked direction length of the magnet track and that of the armature defines an effective stroke length, and wherein a magnetic pole detector formed separately from the armature is arranged beside an end of the armature opposite to a motor lead side of the armature so that magnetic pole detection can be consistently performed even if the magnet track is moved to a stroke end.

5. The moving magnet type linear slider as recited in claim 1, further comprising a gravity compensation spring for compensating a weight of the movable unit, the gravity compensation spring being provided at a bottom of the magnet track so as to face the fixed base.

6. The moving magnet type linear slider as recited in claim 2, further comprising a gravity compensation spring for compensating a weight of the movable unit, the gravity compensation spring being provided at a bottom of the magnet track so as to face the fixed base.

7. The moving magnet type linear slider as recited in claim 3, further comprising a gravity compensation spring for compensating a weight of the movable unit, the gravity compensation spring being provided at a bottom of the magnet track so as to face the fixed base.

8. The moving magnet type linear slider as recited in claim 4, further comprising a gravity compensation spring for compensating a weight of the movable unit, the gravity compensation spring being provided at a bottom of the magnet track so as to face the fixed base.

9. A moving magnet type linear slider, comprising:
- a linear motor slidably arranged on a fixed base via a linear guide, the linear motor having a field constituting a movable unit and an armature constituting a stator; and
- a detector for detecting a relative position of the movable unit and the fixed base,
- wherein the movable unit is configured to be reciprocated with respect to the fixed base along a longitudinal direction of the linear guide,
- wherein the field of the linear motor includes a horizontally arranged generally U-shaped magnetic yoke and field permanent magnets arranged on inner opposed surfaces of the magnetic yoke,
- wherein the armature of the linear motor is a planar coreless type armature fixed to the fixed base via an armature holder and arranged between the inner opposed surfaces of the magnet yoke, and
- wherein the detector includes a linear scale attached to the movable unit and a sensor head attached to the fixed base so that the sensor head faces the linear scale.

10. The moving magnet type linear slider as recited in claim 9, wherein a stroke direction length $L_{mg}$ of the movable unit is set to be longer than a stroke direction length $L_a$ of the armature, wherein a difference $L_{mg}-L_a$ between the stroke direction length of the movable unit and that of the armature defines an effective stroke length, and wherein a magnetic pole detector is built in the armature to detect an initial magnetic pole of the linear slider.

11. The moving magnet type linear slider as recited in claim 9, wherein a stroke direction length $L_{mg}$ of the movable unit is set to be shorter than a stroke direction length $L_a$ of the armature, and wherein a difference $L_a-L_{mg}$ between the stroke direction length of the movable unit and that of the armature defines an effective stroke length.

12. The moving magnet type linear slider as recited in claim 9, wherein a stroke direction length $L_{mg}$ of the movable unit is set to be longer than a stroke direction length $L_a$ of the armature, wherein a difference $L_{mg}-L_a$ between the stroked direction length of the movable unit and that of the armature defines an effective stroke length, and wherein a magnetic pole detector formed separately from the armature is arranged beside an end of the armature opposite to a motor lead side of the armature so that magnetic pole detection can be consistently performed even if the movable unit is moved to a stroke end.

13. The moving magnet type linear slider as recited in claim 9, further comprising a gravity compensation spring for compensating a weight of the movable unit, the gravity compensation spring being provided at a bottom of the movable unit so as to face the fixed base.

14. The moving magnet type linear slider as recited in claim 10, further comprising a gravity compensation spring for compensating a weight of the movable unit, the gravity compensation spring being provided at a bottom of the movable unit so as to face the fixed base.

15. The moving magnet type linear slider as recited in claim 11, further comprising a gravity compensation spring for compensating a weight of the movable unit, the gravity compensation spring being provided at a bottom of the movable unit so as to face the fixed base.

16. The moving magnet type linear slider as recited in claim 12, further comprising a gravity compensation spring for compensating a weight of the movable unit, the gravity compensation spring being provided at a bottom of the movable unit so as to face the fixed base.

* * * * *